(12) United States Patent
Spracklen et al.

(10) Patent No.: US 9,912,992 B2
(45) Date of Patent: *Mar. 6, 2018

(54) METHOD AND SYSTEM FOR ENHANCING USER EXPERIENCE FOR REMOTING TECHNOLOGIES

(71) Applicant: VMware, Inc., Palo Alto, CA (US)

(72) Inventors: Lawrence A. Spracklen, Boulder Creek, CA (US); Banit Agrawal, Sunnyvale, CA (US); Rishi Bidarkar, San Jose, CA (US)

(73) Assignee: VMware, Inc, Palo Alto, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 15/003,378

(22) Filed: Jan. 21, 2016

(65) Prior Publication Data

US 2016/0142769 A1 May 19, 2016

Related U.S. Application Data

(63) Continuation of application No. 13/765,598, filed on Feb. 12, 2013, now Pat. No. 9,257,092.

(51) Int. Cl.
*G06K 9/00* (2006.01)
*H04N 21/462* (2011.01)
(Continued)

(52) U.S. Cl.
CPC ....... *H04N 21/4621* (2013.01); *G06F 3/0481* (2013.01); *G06F 3/04842* (2013.01);
(Continued)

(58) Field of Classification Search
None
See application file for complete search history.

(56) References Cited

U.S. PATENT DOCUMENTS 7,602,388 B2    10/2009 Plut
8,527,654 B2    9/2013 Vonog et al.
(Continued)

FOREIGN PATENT DOCUMENTS

WO    2008014288 A2    1/2008
WO    2011060442 A2    5/2011

OTHER PUBLICATIONS

International Searching Authority, International Application No. PCT/US2014/015695, Notification of Transmittal of the International Search Report and the Written Opinion of the International Searching Authority, or the Declaration, International Search Report and Written Opinion of the International Searching Authority dated Jun. 10, 2104.

*Primary Examiner* — Soo Park

(57) ABSTRACT

The disclosure herein describes a client-side system that enhances user experience on a remoting client without consuming additional network bandwidth. During operation, the system receives a sequence of frame updates for a display screen, and determines a sequence of frames corresponding to the frame updates. The system further adaptively applies one or more image enhancing techniques to the sequence of frames based on available network bandwidth, frame refresh rate, or image quality. The image enhancement techniques include predicting a frame based on previously received frames, interpolating a frame based on at least two buffered frames, and reducing appearance of artifacts in a received frame, thereby reducing visual artifacts.

20 Claims, 8 Drawing Sheets

(51) Int. Cl.

| | | |
|---|---|---|
| *G06F 3/14* | (2006.01) | |
| *G06F 9/44* | (2018.01) | |
| *G06F 3/0481* | (2013.01) | |
| *H04N 19/172* | (2014.01) | |
| *H04N 19/117* | (2014.01) | |
| *H04N 19/136* | (2014.01) | |
| *H04N 19/154* | (2014.01) | |
| *H04N 19/164* | (2014.01) | |
| *G09G 5/02* | (2006.01) | |
| *G09G 5/14* | (2006.01) | |
| *G06F 3/0484* | (2013.01) | |
| *H04N 21/438* | (2011.01) | |
| *H04N 21/44* | (2011.01) | |
| *H04N 21/442* | (2011.01) | |
| *H04N 19/587* | (2014.01) | |

(52) U.S. Cl.
CPC .......... *G06F 3/1454* (2013.01); *G06F 9/4445* (2013.01); *G09G 5/026* (2013.01); *G09G 5/14* (2013.01); *H04N 19/117* (2014.11); *H04N 19/136* (2014.11); *H04N 19/154* (2014.11); *H04N 19/164* (2014.11); *H04N 19/172* (2014.11); *H04N 21/438* (2013.01); *H04N 21/44008* (2013.01); *H04N 21/4424* (2013.01); *H04N 21/44209* (2013.01); *G09G 2340/0435* (2013.01); *G09G 2350/00* (2013.01); *G09G 2354/00* (2013.01); *H04N 19/587* (2014.11)

(56) References Cited

U.S. PATENT DOCUMENTS

| | | |
|---|---|---|
| 8,606,966 B2 | 12/2013 | Panigrahi et al. |
| 2008/0100598 A1 | 5/2008 | Juenger |
| 2009/0147853 A1 | 6/2009 | Dane et al. |
| 2009/0219379 A1 | 9/2009 | Rossato et al. |
| 2010/0226435 A1 | 9/2010 | Riemens et al. |
| 2011/0032999 A1 | 2/2011 | Chen et al. |
| 2013/0219012 A1 | 8/2013 | Suresh et al. |

METHOD AND SYSTEM FOR ENHANCING USER EXPERIENCE FOR REMOTING TECHNOLOGIES

CLAIM OF PRIORITY

This application claims priority to and is a continuation of U.S. patent application Ser. No. 13/765,598, filed on Feb. 12, 2013, entitled "Method and System for Enhancing User Experience for Remoting Technologies", which is incorporated herein by reference in its entirety.

BACKGROUND

In display remoting technologies, the graphical user interface (GUI) of an application or operating system is captured at a server and sent as a stream of pixels to a client device at the location of a user. Inputs by the user into the client device may be captured and transmitted to the application or operating system running at the server. Display remoting is used in a variety of circumstances, including when using Internet conferencing applications, when remotely accessing home or office computers using a variety of services, when using Microsoft Windows terminal services, instant gaming (or "game streaming") services, or when accessing a virtual desktop infrastructure (VDI), among others.

When a user connects to a lightly-loaded remoting server over a fast LAN network, the user experience can be comparable to consuming the content locally, i.e., comparable with using a locally-executing desktop, or playing a video game locally. However, in environments with limited network bandwidth and/or CPU resources, the remoting agent is forced to make tradeoffs. In most instances, such tradeoff involves reducing the frame rate and applying more aggressive compression techniques to the data transmitted to the remote client. While these bandwidth or computing-resource saving techniques ensure the remoting solution conforms to the available resource limitations, such techniques can degrade the user experience (e.g., resulting in fuzzy still images and jerky and fuzzy animation or video).

SUMMARY

The disclosure herein describes a client-side system that enhances user experience on a remoting client without consuming additional network bandwidth. During operation, the system receives a sequence of frame updates for a display screen, and determines a sequence of frames corresponding to the frame updates. The system further adaptively applies one or more image enhancing techniques to the sequence of frames based on available network bandwidth, frame refresh rate, or image quality. The image enhancement techniques include predicting a frame based on previously received frames, interpolating a frame based on at least two buffered frames, and reducing the appearance of artifacts introduced by lossy compression in a received frame, thereby reducing visual artifacts.

BRIEF DESCRIPTION OF FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

This disclosure herein describes a system that enhances the experience of a user of a remote client by using real-time, adaptive image enhancement techniques on the client side. During operation, a user-experience enhancing application running on a client machine monitors the frame updates received from a remote server, and based on observed parameters, such as network bandwidth, frame rate, and frame quality, adaptively apply various local image enhancement techniques. As a result, the client can locally improve the user experience without requiring additional bandwidth. Furthermore, some embodiments of the present system can be agnostic to the remoting protocol used by the client.

The client-side user experience enhancement system described herein can use a variety of enhancement techniques, and dynamically and adaptively apply these techniques to the received frame updates. For example, one technique to enhance user real-time-operation experience is to predict a future frame update based on received frame updates to make motions appear smoother. Another technique for enhancing less time-critical video experience is to cache a number of frames and interpolate intermediate frames to make the video stream smoother. A third technique is to blur or smoothen block edges when aggressive compression techniques are used by the remote server, which typically causes "checkerboarding" effects on displayed frames on the client side. The enhancement system disclosed herein can adaptively determine which technique(s) to apply based on network condition, user operation, and different regions displayed on the user interface.

In this disclosure, the term "remoting" refers to any application or protocol that facilitates remote access to computing resources, typically identified as "remoting server" or "server," from as remoting client or "client". Such remoting applications can include, but are not limited to, desktop virtualization applications such as virtual desktop infrastructure (VDI), desktop sharing application such as WebEX, GoToMyPC, TeamViewer; remote access technologies such as LogMeIn, VNC, Remote Desktop Protocol (RDP), PCoIP, etc.; and in some cases, remote gaming (so-called "cloud gaming" or "gaming on demand" services such as OnLive, Gaikai, CoreOnline, etc.,) and video streaming applications.

Figure 1:
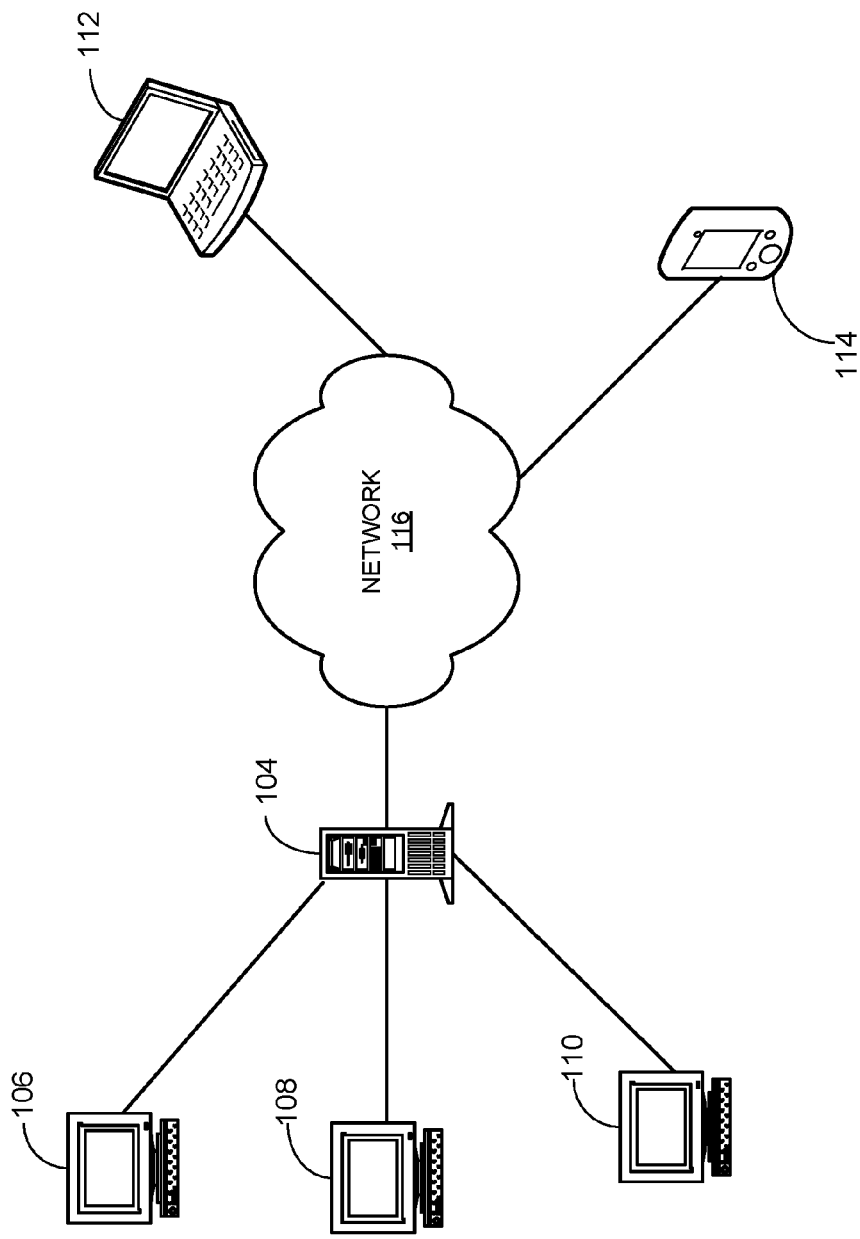
FIG. 1 illustrates an exemplary network architecture that facilitates a client-side adaptive user-experience enhancement system.

FIG. 1 illustrates an exemplary network architecture that facilitates a client-side adaptive user experience enhancement system. In this example, a network 116 couples clients 112 and 114 to a physical host 104. Physical host 104 may host a number of virtual machines, such as virtual machines 106, 108, and 110. Although shown separately, each virtual machine is a software construct, or abstraction of a physical computer that executes on and within host 104 as generally understood in the art of computer virtualization. In one embodiment, any virtual machine can function as a desktop or application remoting server, and any client can use a remote access client software to permit a user to remotely access the user interface of the virtual machine. In further embodiments, a virtual machine (or physical host 104) can function as a video server and stream video content to a client.

Network 116 can be any type of network, including but not limited to the Internet, a virtual private network (VPN), a local area network (LAN), a wireless network, a telephone or cellular network, or a combination thereof. Clients 112 and 114 can be any computing device, such as tablets, desktop or laptop computers, smart phones, etc. In one embodiment, a respective client, such as client 112, runs an adaptive user-experience enhancement application. This enhancement application monitors the received frame updates and received image quality from the remoting server as well as the network condition. Based on such observation, the enhancement application selects one or more enhancement techniques to apply to the received frame updates.

For example, virtual machine 106 can stream frame updates for a graphical user interface for display at client 112, and can adjust the frame rate depending on the demands of the user's workload and/or the network bandwidth. When client 112 receives the stream of frame updates, the enhancement application residing on client 112 can adaptively enhance the presentation of virtual desktop by interpolating and inserting additional frames into the stream to increase the display frame rate. In another example, if the virtual desktop displayed on client 112 is presenting a streamed video which does not require much user interaction, the enhancement application on client 112 may selectively buffer the frames corresponding to the video window, and interpolate additional frames between the buffered frames. This enhancement is more deterministic and hence could produce better results. However, due to the buffering, such techniques could introduce a small amount of delay, which might be negligible for video streaming.

In some embodiments, remoting server 106 might decrease the stream's frame rate if client 112 can sustain a satisfactory display quality while the screen pixels are not changing rapidly, or if they are changing in a predictable manner. In addition, server 106 can assist the enhancement application on client 112 with interpolating and inserting frames locally to attain a target frame rate.

In a further embodiment, the enhancement application on client 112 can detect user inputs, such as mouse clicks and movements, and use such information to assist in making the decision as to what enhancement techniques to use. For example, if the enhancement application detects that a user is performing a mouse "drag" operation (i.e., mouse movement with the mouse button held down), and has received frame updates that suggest a window is moved across the graphical user interface (GUI), the enhancement application can use the user's mouse movement to predict the speed and direction of the window's movement, and predict, or extrapolate frame updates to provide smoother animation.

Figure 2:
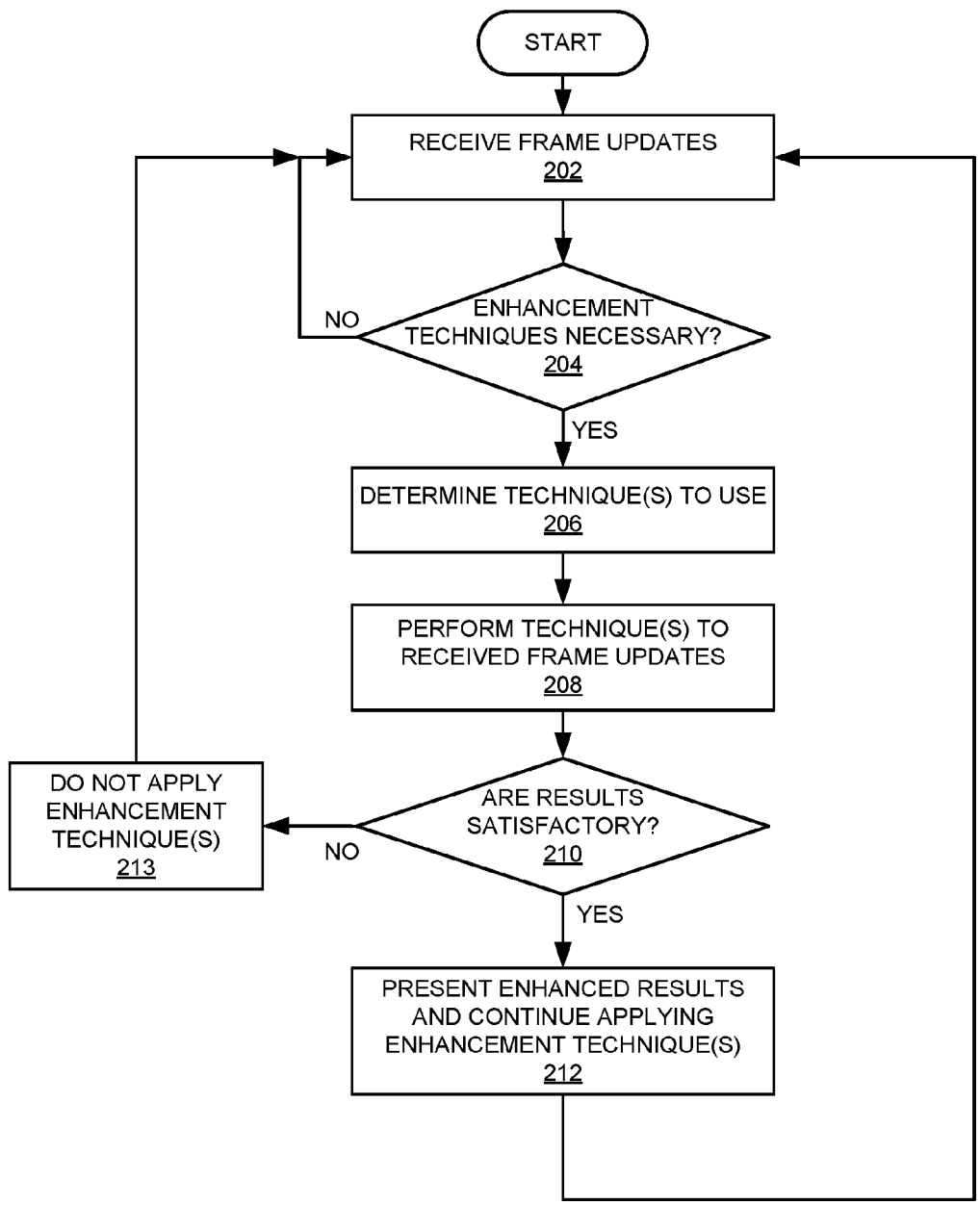
FIG. 2 presents a flowchart illustrating an exemplary process of adaptively applying different enhancement techniques on a client machine to improve user experience with a remoting application.

FIG. 2 presents a flowchart illustrating an exemplary process of adaptively applying different enhancement techniques on a client machine to improve user experience with a remoting application. During operation, the client machine receives a stream of frame updates from the remoting server (operation 202). The enhancement application on the client machine then determines whether it is necessary to apply any user-experience enhancement techniques (operation 204). For example, when the bandwidth and/or the frame refresh rate drops below a certain threshold, or when the video noise or artifacts reach a certain level, the enhancement application may determine that local user-experience enhancement techniques would be necessary.

If no enhancement is necessary, the enhancement application continues to monitor received frame updates. If such enhancement is necessary, the enhancement application further determines one or more enhancement techniques to use (operation 206). As described in more detail below, depending on different types of user-experience deterioration and the type of user operation, different enhancement techniques can be applied. For example, if the user is operating on a window (e.g., dragging, scrolling, resizing, etc.), the system can use frame prediction based on previously received frame updates. If the user is just streaming video content without any user input, the system might cache the received frame updates and interpolate additional frames to increase the frame refresh rate. If the picture quality of received frame updates is deteriorating, the system can use a technique to reduce the appearance of artifacts introduced by lossy compression. Note that more than one enhancement technique can be used concurrently. Furthermore, the system can apply different enhancement to different areas of a virtual desktop.

Subsequently, the enhancement application can perform the selected enhancement technique(s) to the received frame updates (operation 208). In one embodiment, the enhancement application might not present the result of the enhancement right away. Instead, the enhancement application can perform a tentative enhancement and determine whether the results are satisfactory based on subsequently received frame updates (operation 210). For example, the enhancement application may perform frame prediction and compare these predicted frames with subsequently received frame updates—to determine whether the enhancement technique is accurately predicting frames closely matching the motion observed in the subsequently received frames. This test period can continue for a number of frames. Once the system is sufficiently confident that it is able to accurately predict future motion, the system can begin inserting the predicted frames into the displayed stream to improve the frame rate. If the results are not satisfactory (e.g., the predicted frames differ too much from the actual received frame updates), the enhancement application can choose not to apply this enhancement technique (operation 213), and can choose to either temporarily disable these specific enhancement algorithms, or continue to remain in this initial test mode until it encounters a form of content that it can accurately process. Note that this "test run" process may or may not be performed, either depending on implementation, configuration, and/or the type of enhancement techniques used. For example, if the enhancement application uses frame interpolation based on received, buffered frames, or uses techniques to reduce video artifacts, then the results of these enhancement techniques can be presented to the user right away without any "test run." In case multiple enhancement techniques are used, the "test run" process may apply to only a subset of the techniques. Following operation 210, if the enhancement results are satisfactory, the enhancement application presents the enhanced results and continues applying such technique(s) (operation 212). The aforementioned process can be carried out continuously as long as the client machine is receiving frame updates from the remoting server. For example, the system can continuously monitor the result of the enhancement techniques prior to applying the modified or inserted frames to the stream. If the correctness of the enhancement techniques does not surpass a certain threshold (e.g., when the percentage of mis-predicted frames falls above a low threshold), the system can fall back to the "learning phase" or "test run" mode as described above. This mechanism allows the system to ensure that the enhancement techniques can actually improve, instead of impair, user experience. Furthermore, during these "test run" periods, comparison between the predicted frames and the actual received frames can be used to provide learning information for the enhancement algorithms.

Figure 3:
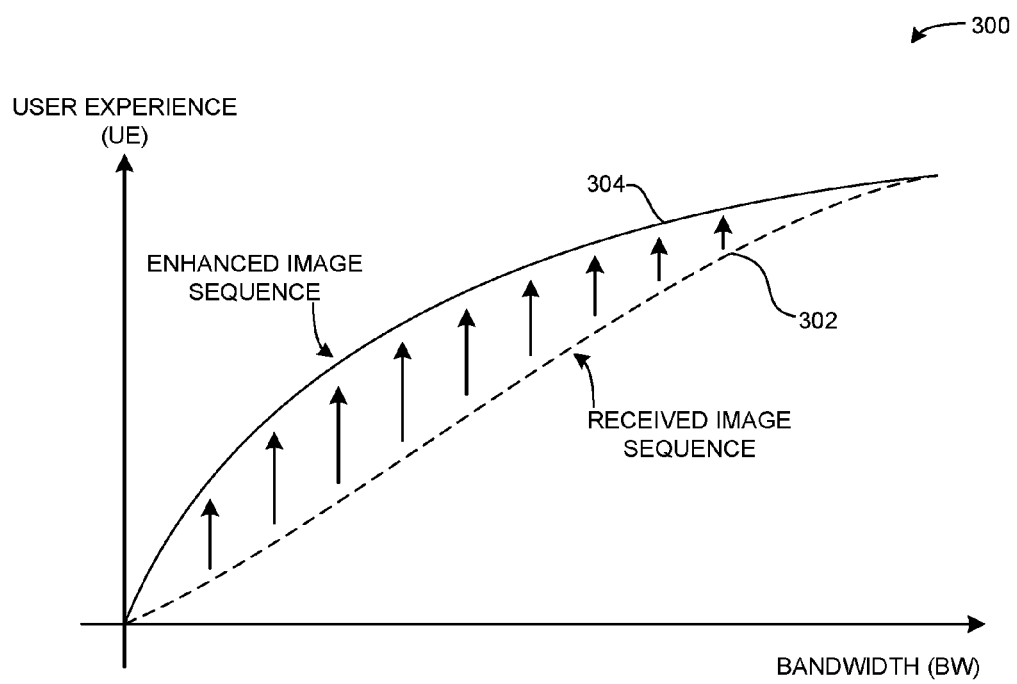
FIG. 3 presents a graph illustrating an increase in a user's experience for a frame sequence that has been enhanced by the client device.

The adaptive user-experience enhancement approach described in FIG. 2 aims to improve the user's experience without consuming additional network bandwidth. This goal is achieved by adding some computing overhead on the client side. Given the abundance of computing power in today's devices, such an overhead can be negligible. In some embodiments, it is possible to offload some or all of these image enhancement operations to graphics processing units (GPU's) or other custom imaging hardware, which are often present on an ever increasing number of client endpoints. Such offloading can increase the sophistication of these techniques and significantly reduce their power consumption. FIG. 3 presents a graph illustrating an increase in a user's experience for a frame sequence that has been enhanced by the client device. In graph 300, the x-axis indicates the available bandwidth for a data connection between a client and a server. The y-axis indicates the quality of user experience. A curve 302 illustrates the user experience without any client-side enhancement. As can be seen, the user experience typically improves more or less linearly with the available bandwidth, until the available bandwidth reaches a point beyond which additional bandwidth can no longer significantly improve the user experience (e.g., when the frame rate reaches the max value). The adaptive enhancement mechanism described herein can improve the user experience quite significantly when the available bandwidth is sub-optimal, as indicated by curve 304.

For example, as the network bandwidth available to the user's client device decreases, the remoting server may need to decrease the frame refresh rate at which it updates the client device's screen, which results in the user experiencing "jerky" animations that appear to skip frames. In addition, the server may employ more aggressive compression algorithms to reduce the amount of data sent over the network, which introduces video artifacts or noise (such as rough "checkerboard" in each frame). By adaptively applying user-experience enhancement techniques, such as frame prediction and insertion, frame interpolation, and artifact reduction (described in more detail below), the client-side enhancement application can improve the user experience without requiring or consuming more network bandwidth.

Figure 4A:
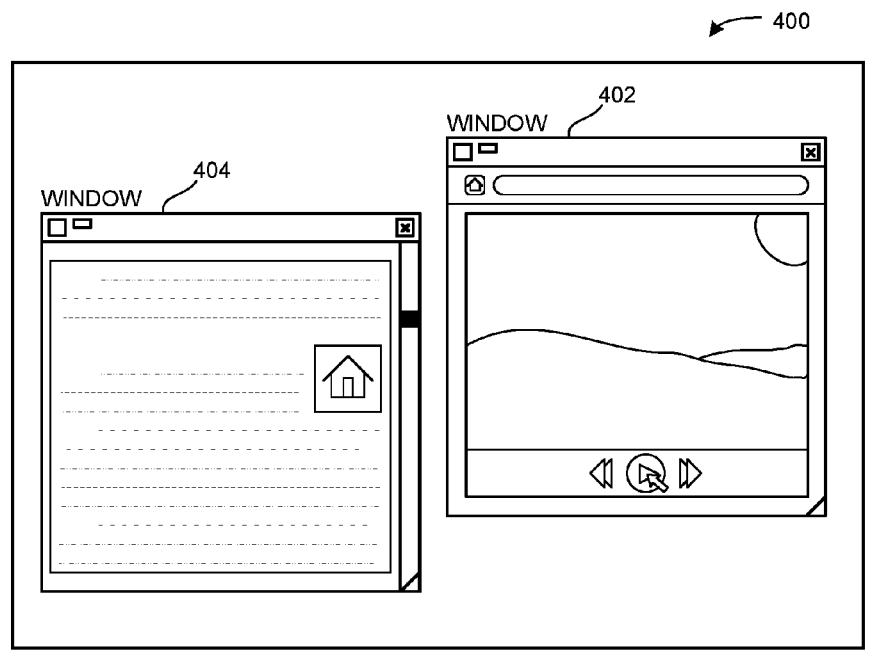
FIG. 4A illustrates an exemplary display screen presenting a user interface.

As mentioned above, different types of user-experience enhancement techniques can be adaptively applied based on different types of content that is distributed across the network, as well as different types of operations the user performs on the client machine. FIG. 4A illustrates an exemplary display screen 400 presenting a user interface. Specifically, a display screen 400 is a virtual desktop generated by a remoting server, transmitted across the network, and displayed at the user's client machine. Display screen 400 includes a window 402 that presents a movie, and includes a window 404 that displays a document. During operation, the user can use a mouse pointer to control the playback of the movie by interacting with control buttons within window 402, or by pressing keys on a keyboard that control the movie playback. When the user plays, fast-forwards, or rewinds the movie, such actions are transmitted to the remoting server. In response, the remoting server generates and streams frame updates to refresh the movie frames presented within window 402.

The user can also interact with window 404 to navigate through the document, or to modify the contents of the document. The user can navigate through the document, for example, by using a pointing device (e.g., a mouse pointer, or a touch-screen interface) to click on a section of a horizontal or vertical scroll bar, or to click on an arrow of the scroll bars. Alternatively, the user can press a page-up or page-down button of a keyboard, or perform a touch-screen gesture (e.g., a finger swipe) that activates a window-scrolling operation. When the user modifies or navigates through the document, the remoting server generates and streams frame updates that refresh the document image presented within window 404.

Figure 4B:
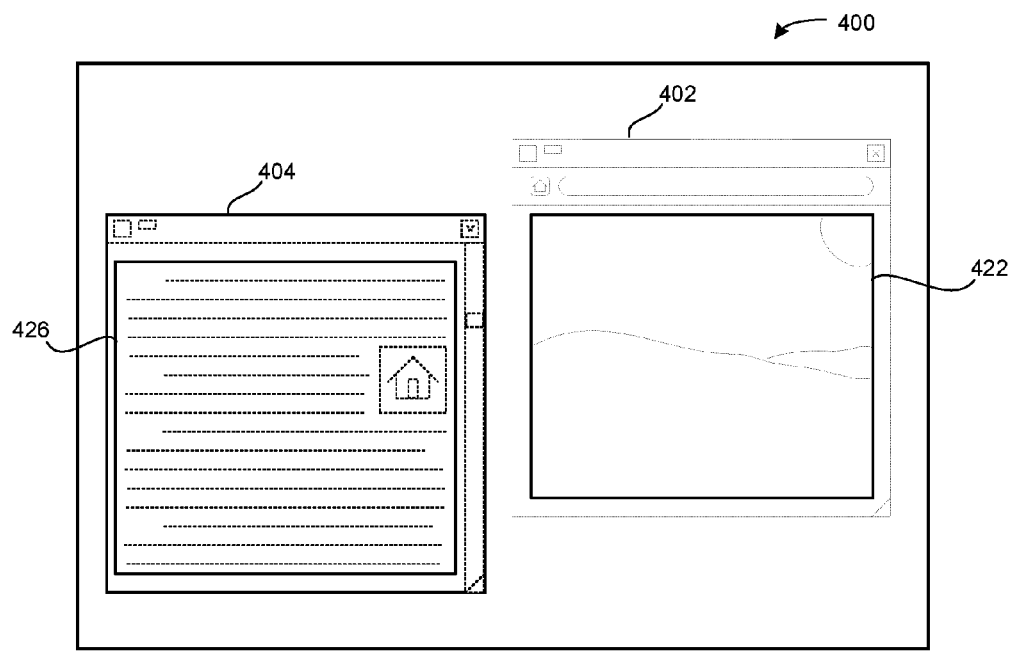
FIG. 4B illustrates portions of display screen that are updated in response to a user event.

FIG. 4B illustrates portions of display screen 400 that are updated in response to a user event. Specifically, display screen 400 includes a screen portion 422 that is updated to draw a frame sequence for a movie. In addition, screen portion 404 is updated to draw a user-interface window that a user can interact with, and includes a screen portion 426 that draws and updates the document for the user.

Once the user enters a command to play the movie, the remoting server generates a stream frame updates to refresh the movie frames within screen portion 422 without requiring further input from the user. On the other hand, if the user interacts with the UI window 402 while the movie is playing, the server can also generate frame updates to refresh window portion 422 in response to the user event. For example, if the user resizes UI window 402 or drags UI window 402 to a new screen position, the server can generate a sequence of frame updates that modify the presentation of screen portion 422 according to the user events. As another example, if the user scrolls through the document displayed in window portion 426, the server can generate a sequence of frame updates that respond to the user's scroll events to update screen portion 426 with the new sections of the document.

Based on content delivered from the remoting server (such as the examples depicted in FIGS. 4A and 4B), the enhancement application residing on the client machine can dynamically select different user-experience enhancement techniques. For example, when the user is only streaming a movie in window 402, the local enhancement application can buffer the received frame updates (at the cost of causing a slight delay when the initial buffering takes place), and interpolate additional frames and insert them into the frame stream, which results in improved frame refresh rate. It may also be necessary to delay the audio stream a corresponding amount to ensure correct audio-video synchronization. In many remoting systems, the audio signals and image sequences are timestamped, which ensures this re-synchronization of the audio and image stream. In systems where timestamps are not available, it is possible to delay the audio stream by a similar duration to the buffering being introduced into the imaging stream. When the user is performing operations on a window, however, the enhancement application can predict future frame updates (instead of buffering received frame updates and interpolate between them). This different enhancement technique facilitates video improvement without causing any delay, which allows the user to experience real-time or near-real-time response of the virtual desktop. In a further embodiment, when the remoting server uses a more aggressive compression algorithm which causes video noise and artifacts, the enhancement application can apply a technique to reduce the appearance of such artifacts. Note that different enhancement techniques, such as frame interpolation, frame prediction, and artifact reduction, can be used concurrently to different areas of a displayed window. These enhancement techniques are described in more detail below.

Figure 5A:
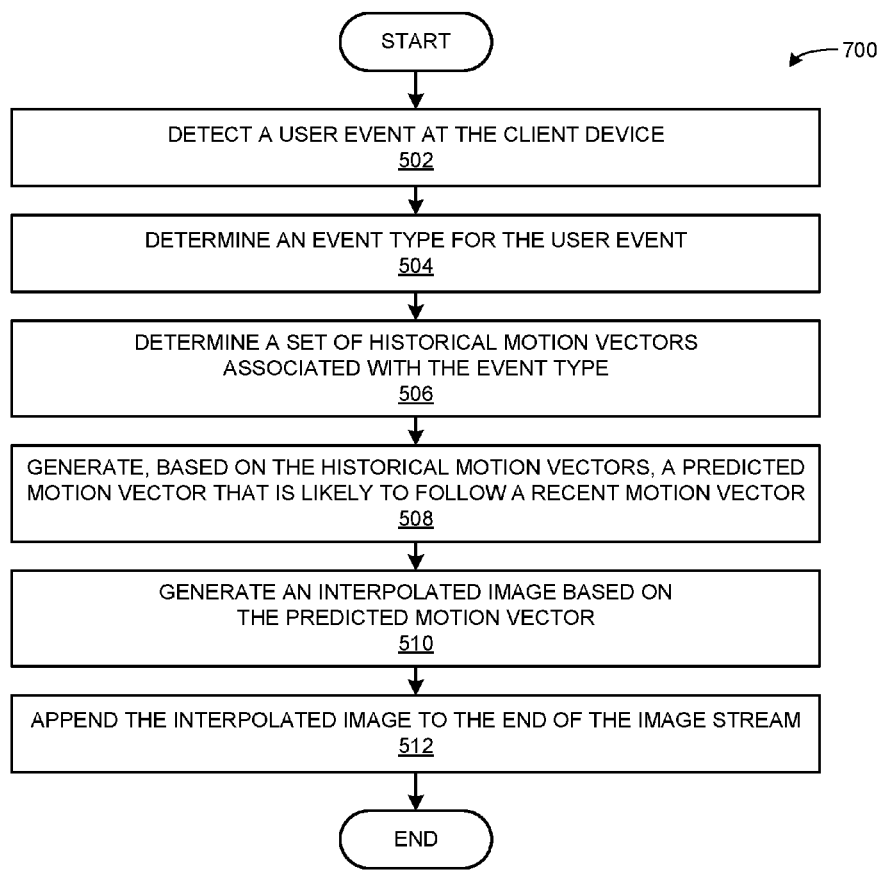
FIG. 5A presents a flow chart illustrating a method for predicting and inserting a frame into a live frame stream based on a user event.

FIG. 5A presents a flow chart 500 illustrating a method for predicting and inserting a frame into a live frame stream based on a user event. During operation, the system can detect a user event (operation 502), and determines an event type for the user event (operation 504). The event type can include a mouse click, a mouse drag, a keyboard input, a touch-screen gesture, etc. The event type can also correspond to a user interaction with a UI element, such as a window-scrolling operation, a window-resizing operation, or a text entry into a text field. As a further example, the event type can correspond to a UI interaction such as a mouse-pointer movement, an interaction with a UI-controlling object (e.g., a UI button, a UI slider, etc.), and/or a drag operation that moves a UI element to a new screen position (e.g., a window-dragging operation).

The system then determines a set of historical motion vectors associated with the event type (operation 506), and generates a predicted motion vector that is likely to follow a recent motion vector, based on the historical motion vectors (operation 508). The system then generates an interpolated image based on the predicted motion vector (operation 510), and appends the interpolated image to the end of the image stream (operation 512). Historical motion vectors can be identified by maintaining a record of particular mouse events, and concurrent frame update regions and motion vectors associated with the concurrent frame updates. For example, suppose a user clicks a down-arrow at the bottom of a scroll bar, causing a text window to scroll up by 5 pixels. The remoting client might not have the knowledge that the location of the click corresponds to a scroll bar since that information is only available at the server. However, concurrent to the mouse click at that location, a large rectangle of window updates (corresponding to the area being scrolled) may be observed. Furthermore, the differences between the updated region and the prior region may be analyzed to determine a motion vector—for example, a large area of the received rectangle corresponds with previously displayed graphical information, but displaced by some distance in x, y coordinates. Motion vector search algorithms are well known in the field of video streaming, and can be leveraged for this purpose. The association between user input and concurrent screen area and motion vector may be conserved in a table or other data structure by the enhancement application so that when the user again clicks at or near the same location, it can reasonably be expected that the same or similar scroll event will occur. This predicted update information can be used to generate and insert images between received images to smooth the animation. This technique may be expanded to conserve information related to window drag or resize events, scrollbar drag events, scroll wheel events, etc. An incorrect guess as to what might happen can be overwritten in a timely manner by the next received frame update, so the occasional mistake will only result in a momentary imperfection of the display.

Figure 5B:
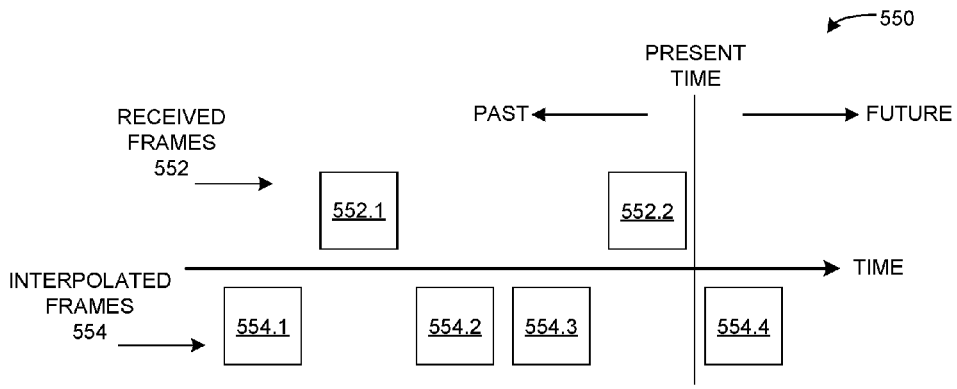
FIG. 5B illustrates an exemplary timeline for predicting and inserting a frame into a live frame stream.

FIG. 5B illustrates an exemplary timeline 550 for predicting and inserting a frame into a live frame stream. Timeline 550 indicates a sequence of received frame updates 552 (including frames 552.1 and 552.2) that the client uses to update the display screen over time. Timeline 550 also includes a sequence of interpolated frames 554, which the client uses to increase the frame refresh rate of the frame sequence presented to the user. Specifically, the client generates extrapolated frames 554 (including frames 554.1, 554.2, 554.3, and 554.4) by predicting one or more motion vectors that are likely to follow received frames 552 and based on one or more user events. For example, the client can extrapolate frames 554.2 and 554.3 from received frame 552.1. Subsequently, when the client receives frame 552.2, the client can extrapolate frame 554.4 from frames 552.2 and 552.1.

In one embodiment, when the client receives one or more frame updates from the remoting server, the client can determine a quality score for previously predicted frames. This quality score can indicate the quality of the enhancement and can be used to determine whether the enhancement technique should be continued.

Figure 6A:
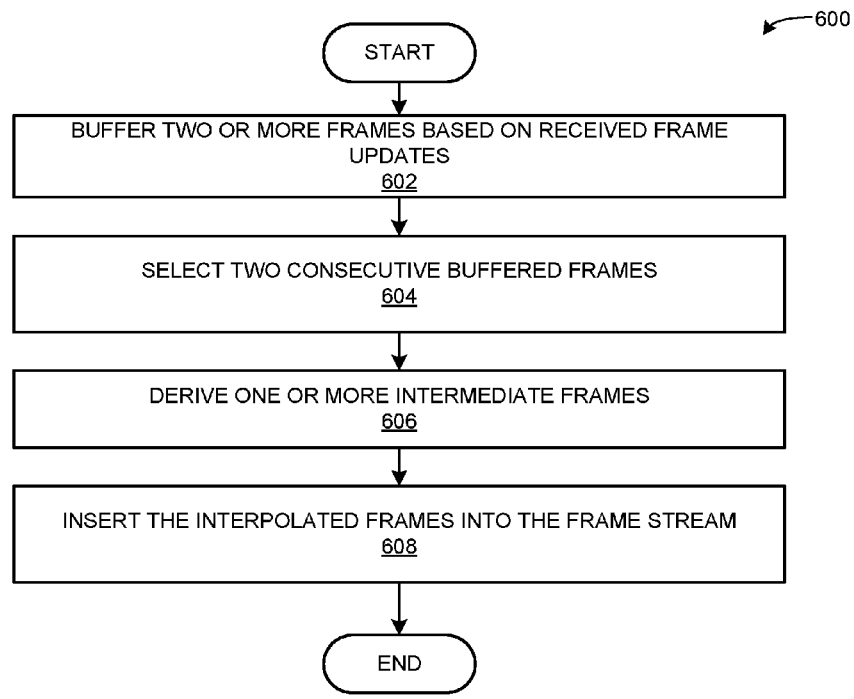
FIG. 6A presents a flow chart illustrating a method for generating and inserting an interpolated frame into a buffered frame stream.

FIG. 6A presents a flow chart 600 illustrating a method for generating and inserting an interpolated frame into a buffered frame stream. During operation, the system buffers two or more frames based on frame updates received from the remoting server (operation 602). The system then selects two consecutive buffered frames (operation 604), and derives one or more intermediate frames by interpolating between the two consecutive buffered frames (operation 606). The system subsequently inserts the interpolated frames into the frame stream between the two buffered consecutive frames (operation 610).

Figure 6B:
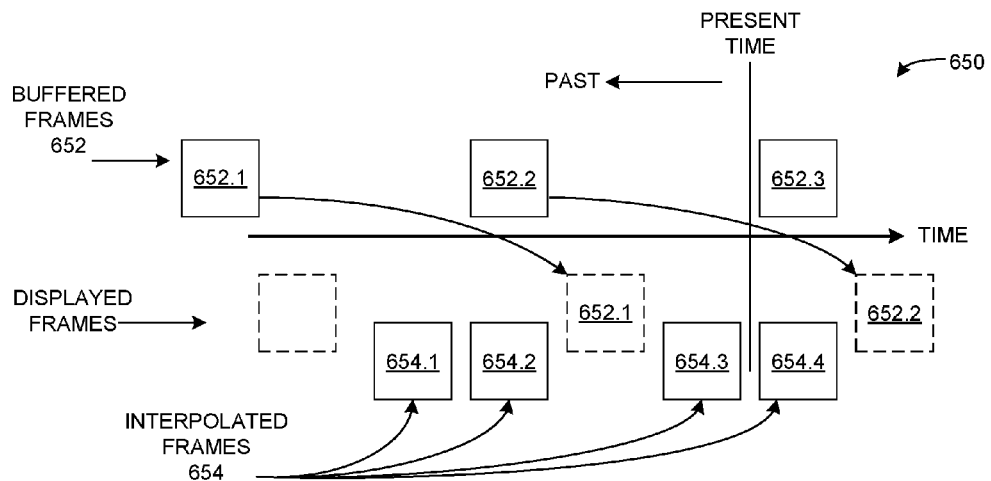
FIG. 6B illustrates an exemplary timeline for generating and inserting an interpolated frame into a buffered frame stream.

FIG. 6B illustrates an exemplary timeline 650 for generating and inserting an interpolated frame into a buffered frame stream. Timeline 650 indicates a sequence of buffered frames 652 (e.g., frames 652.1, 652.2, and 652.3) that the client has constructed based on received frame updates. Timeline 650 also indicates a sequence of interpolated frames 654 (e.g., frames 654.1, 654.2, 654.3, and 654.4).

The client uses buffered frames 652 to derive interpolated frames 654. Note that the frame buffer typically has a predetermined depth, either in terms of time or number of frames. In the example illustrated in FIG. 6B, the buffer has a depth of four frames.

In some embodiments, the client generates interpolated frames 654 by deriving one or more frames from two consecutive frames received from the remoting server. Interpolated frames may be generated from two consecutive frames by first comparing the two consecutive frames and identifying any movement of vectors using well-known vector search algorithms. Once identified, the algorithms are scaled and applied to the initially received frames to generate the intermediate frames. For example, suppose a window is dragged from (x, y) coordinates (3, 12) to (9, 18). The vector for the pixels in the region of the moving window is (+6, +6). If a single frame is interposed between the received frames, then the vector may be scaled by one-half, i.e., (+3, +3) and applied to the designated pixels in the first received frame, causing a repositioning of the window to (6, 15). It is also possible to insert two frames between the received frames by dividing the vector by one-third, resulting in a scaled vector of (+2, +2), which when applied to the first received frame will result in interpolated frames with the window located at (5, 14) in a first interpolated frame and then (7, 16) in the second interpolated frame. The number of temporally-interposed frames and/or depth of the buffer and other factors may be determined by implementation, configuration, available processing power at the client, the need for reduced latency, and/or other factors.

Another enhancement technique the client can use is to reduce the noise or artifacts in a frame constructed from received frame updates. Typically, when the remoting server detects bandwidth degradation in the network, it may switch to a more aggressive image compression algorithm. A common effect of such aggressive compression is that the reconstructed frames on the client side often have visible image compression artifacts, causing the areas around sharp edges to have checkerboard-like artifact. The adaptive enhancement application on the client can detect such image degradation by detecting edges along the block borders (i.e., the borders of the "checkerboard"). In one embodiment, the client can reduce the effect of such artifacts by smoothening or blurring these edges, and possibly enhancing the resolution and/or image contrast for the entire image. A number of algorithms are available to achieve this goal. However, it is also possible that a long edge can be present when a frame contains the image of a window (i.e., the borders of the window). Hence, it is important for the enhancement application to distinguish between a window (or any other UI object) edge and the edges of blocks resulting from video artifacts. One way to distinguish a "hard edge" (i.e., an edge that is part of an actual UI object) from an artifact edge is to determine whether the edge has a consistent color. If it has a consistent color, it is more likely a part of a UI object. If its color varies along the edge, then it most likely indicates the boarder of an artifact.

Figure 7:
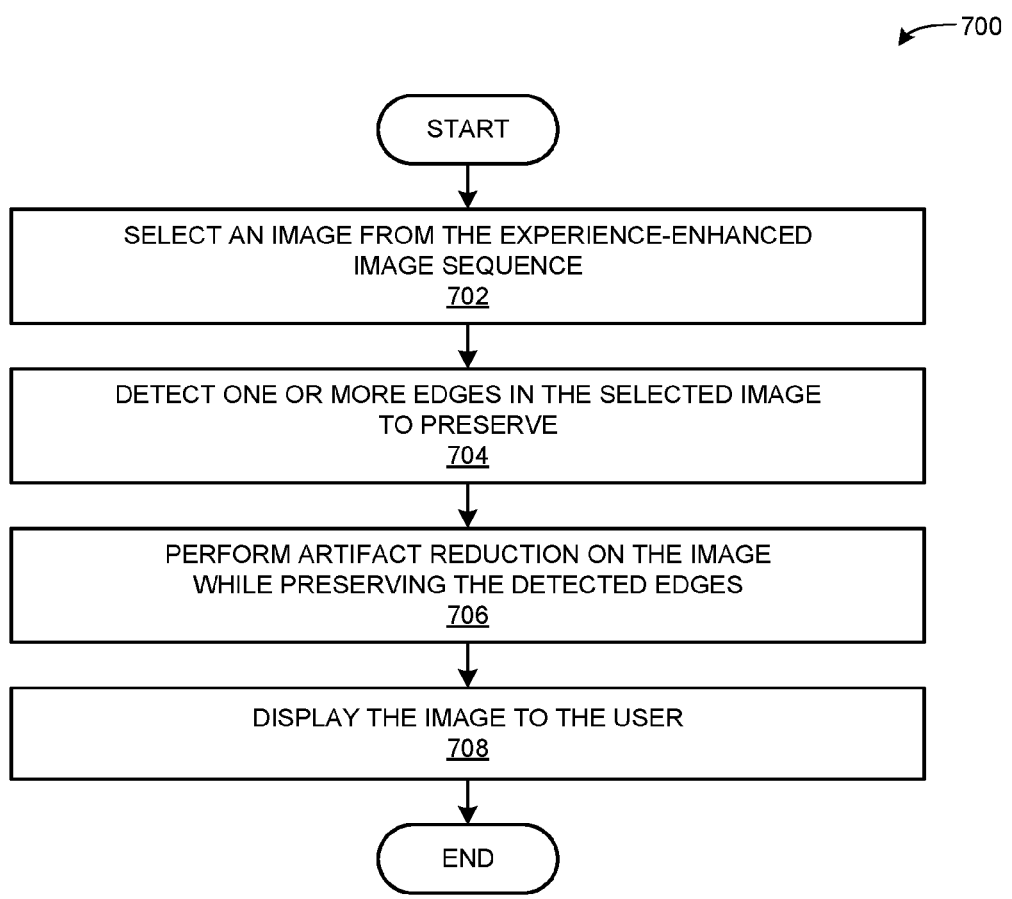
FIG. 7 presents a flow chart illustrating a method for reducing the appearance of artifacts introduced by lossy compression in an image frame or a series of frames.

FIG. 7 presents a flow chart illustrating a method 700 for reducing the appearance of artifacts introduced by lossy compression in an image frame or a series of image frames. During operation, the system selects a frame from the experience-enhanced frame sequence (operation 702), and performs artifact reduction on the frame. The client enhancement system may select frames based at least in part on the extent of compression imposed on the received image. For example, images encoded using JPEG encoding with compression ratios of greater than 30% may be selected for artifact reduction. It should also be noted that the selected frame can be a frame received from the remoting server, or can be an interpolated frame generated by the client. Algorithms for reducing artifacts are well known in the field of image processing. For example, the "checkerboard" effect is one of the many artifacts that can be introduced when performing block-based compression coding for quantization. This effect introduces significant blockiness into the final decompressed image that can be detrimental to user experience. One way to mitigate the appearance of this checkerboard effect is to blur the edges or borders between these blocks. The artifact reduction technique involves first detecting which edges in the image appear to be "hard edges" and thus need to be preserved (operation 704). In some embodiments, a "hard edge" can include any edge aligned to a border between two display elements, such as a border between a UI foreground object (e.g., a window) and a UI background object (e.g., a desktop). The system can detect an edge to preserve by, for example, selecting an edge whose color difference along the edge is greater than a predetermined color threshold, and/or by selecting an edge whose contrast along the edge is greater than a predetermined contrast threshold. Additionally, if the client has information about the remoting protocol used (such as whether certain region in the frame is associated with a video, and other regions are associated with vector drawings such as window objects), the client can leverage this information to help distinguish between "hard edges" and those caused by compression artifacts.

The system then performs artifact reduction, as generally known, on the image while preserving the desirable hard edges (operation 706), and displays the frame to the user (operation 708). In some embodiments, the system can reduce the appearance of artifacts introduced by lossy compression in the image by selecting edges that may have been introduced by the compression algorithms, and that are not determined to be hard edges. The system then adjusts the color for pixels along the selected edges to a color that is a closer match to the surrounding pixels of the screen. Note that, because the system does not process edges that appear to be "hard edges," the system does not blur edges that are meant to distinguish one UI object from other UI objects. Also, because the system process edges that are not "hard edges," the system can remove display artifacts that oftentimes appear due to image-compression algorithms, such as "checkerboarding," while preserving the visual integrity of desirable hard edges.

Figure 8:
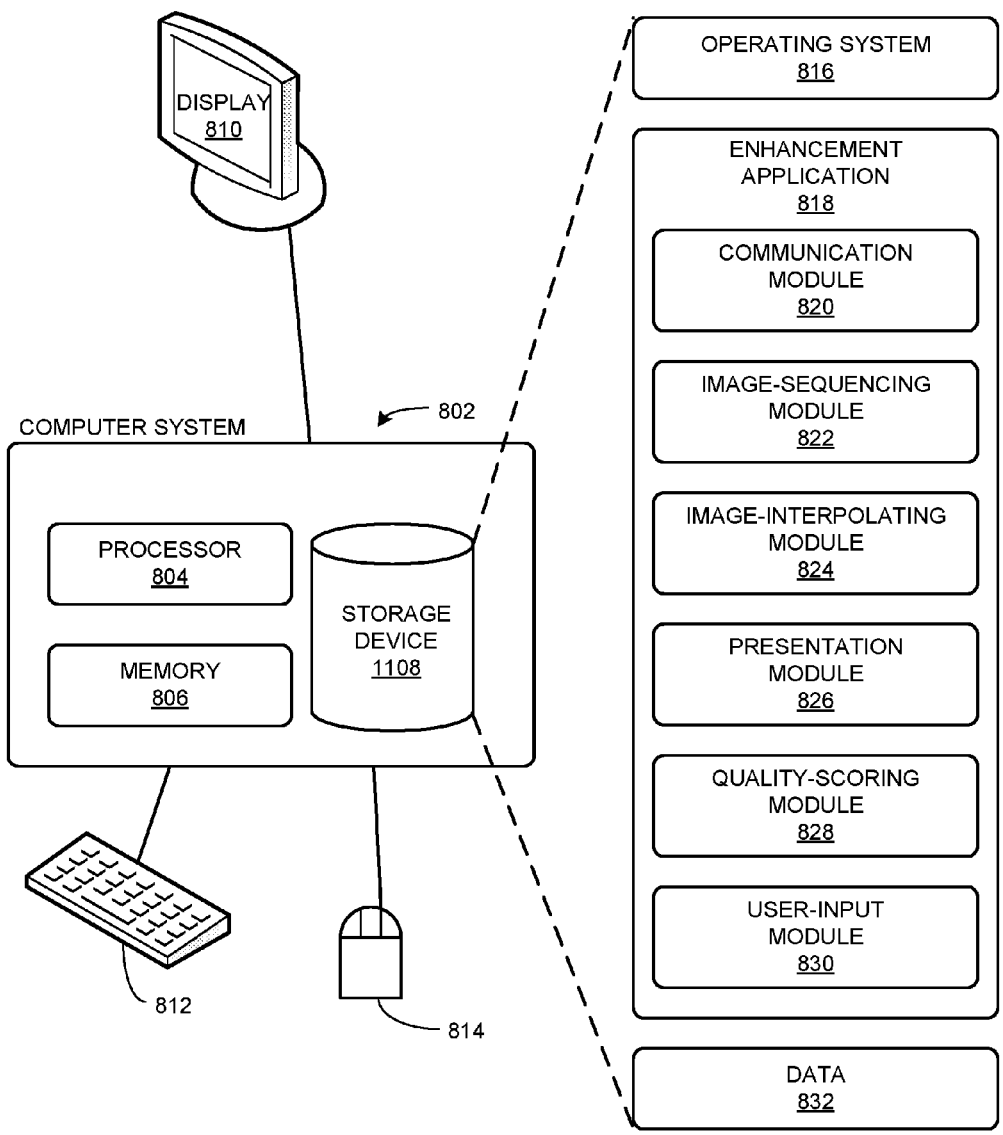
FIG. 8 illustrates an exemplary computer system that facilitates enhancing the presentation of a frame stream.

FIG. 8 illustrates an exemplary computer system 802 that facilitates enhancing the presentation of a frame stream. Computer system 802 includes a processor 804, a memory 806, and a storage device 808. Memory 806 can include volatile memory (e.g., RAM), and can be used to store one or more memory pools. Furthermore, computer system 802 can be coupled to a display device 810, a keyboard 812, and a pointing device 814. Storage device 808 can store an operating system 816, a UI enhancement application 818, and data 832.

Enhancement application 818 can include instructions, which when executed by processor 804, can cause processor 804 to perform methods and/or processes described in this disclosure. Specifically, enhancement application 818 may include communication module 820 comprising instructions for receiving a sequence of frame updates for a display screen. Further, enhancement application 818 can include image-sequencing module 822 for determining a sequence of frames to present to a local user. Enhancement application 818 can include a user-input module 830 for receiving user events, for example, based on a user input from an input device such as mouse, a keyboard, a touch-screen interface, etc., for correlation with concurrent display updates as previously described. Enhancement application 818 can also include an image-interpolating module 824 for generating interpolated or extrapolated frames for insertion into the sequence of frames.

Presentation module 926 may be provided for presenting an enhanced frame sequence to the user via display 910. Finally, in various embodiments, quality scoring module 928 may be provided for computing a quality score for the user experience associated with the enhanced frame sequence.

Data 832 can include any data that is required as input or that is generated as output by the methods and/or processes described in this disclosure. Specifically, data 832 can store at least one or more frames to present to the user.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   executing, on a client device in communication with a remoting server, an image enhancement application, the image enhancement application configured to perform the following three image enhancement techniques:
   predicting a frame based on previously received frames;
   interpolating a frame based on at least two buffered frames; and
   reducing appearance of artifacts in a received frame;
   the image enhancement application further configured to:
   monitor a sequence of frame updates for a display screen received at the client device from the remoting server;
   observe the available network bandwidth, frame refresh rate, and image quality corresponding to the received sequence of frame updates; and
   select one or more of the three image enhancement techniques to apply on the client device based on the observed network bandwidth, frame refresh rate, and/or image quality being sufficiently low.

2. The method of claim 1, wherein the image enhancement application is further configured to:
   determine a type of content distributed by the remoting server; and
   wherein selecting an image enhancement technique is further based on the type of content distributed by the remoting server.

3. The method of claim 1, wherein the image enhancement application is further configured to:
   determine if the received frame updates are associated with a response to a user interaction with a user-interface object and in response select the image enhancement technique that comprises predicting a frame based on previously received frames; and
   determine if the received frame updates are associated with a streamed video and in response select the image enhancement technique that comprises interpolating a frame based on at least two buffered frames.

4. The method of claim 1, wherein predicting the frame based on previously received frames comprises the image enhancement application detecting a user interaction with a user-interface object and using information associated with the user interaction to assist predicting the frame; and
   wherein the user interaction with the user-interface object comprises at least one of:
   a window-scrolling operation;
   a window-resizing operation;
   a text entry into a text field;
   a mouse-pointer movement;
   an button click; and
   a drag operation that moves the object to a new screen position.

5. The method of claim 1, wherein the image enhancement application is further configured to:
   determine whether a selected image enhancement technique sufficiently improves user experience; and
   in response to the image enhancement technique not sufficiently improving user experience, discontinue application of the image enhancement technique.

6. The method of claim 1, wherein reducing appearance of artifacts in the received frame comprises the image enhancement application:
   detecting an edge in the frame;
   determining whether the edge belongs to a user-interface object or is caused by artifacts;
   in response to the edge being caused by artifacts, blurring the edge; and
   in response to the belonging to a user-interface object, preserving the edge.

7. The method of claim 6, wherein determining whether the edge belongs to the user-interface object or is caused by artifacts comprises:
   determining whether a color variance along the edge is greater than a predetermined threshold; and
   in response to the color variance being greater than the threshold, identifying the edge as being caused by artifacts.

8. A non-transitory storage medium storing instructions which when executed by a processor cause the processor to perform a method, the method comprising:
   executing, on a client device in communication with a remoting server, an image enhancement application, the image enhancement application configured to perform the following three image enhancement techniques:
   predicting a frame based on previously received frames;
   interpolating a frame based on at least two buffered frames; and
   reducing appearance of artifacts in a received frame;
   the image enhancement application further configured to:
   monitor a sequence of frame updates for a display screen received at the client device from the remoting server;
   observe the available network bandwidth, frame refresh rate, and image quality corresponding to the received sequence of frame updates; and
   select one or more of the three image enhancement techniques to apply on the client device based on the observed network bandwidth, frame refresh rate, and/or image quality being sufficiently low.

9. The non-transitory storage medium of claim 8, wherein the image enhancement application is further configured to:
determine a type of content distributed by the remoting server; and
wherein selecting an image enhancement technique is further based on the type of content distributed by the remoting server.

10. The non-transitory storage medium of claim 8, wherein the image enhancement application is further configured to:
determine if the received frame updates are associated with a response to a user interaction with a user-interface object and in response select the image enhancement technique that comprises predicting a frame based on previously received frames; and
determine if the received frame updates are associated with a streamed video and in response select the image enhancement technique that comprises interpolating a frame based on at least two buffered frames.

11. The non-transitory storage medium of claim 8, wherein predicting the frame based on previously received frames comprises the image enhancement application detecting a user interaction with a user-interface object and using information associated with the user interaction to assist predicting the frame; and
wherein the user interaction with the user-interface object comprises at least one of:
a window-scrolling operation;
a window-resizing operation;
a text entry into a text field;
a mouse-pointer movement;
an button click; and
a drag operation that moves the object to a new screen position.

12. The non-transitory storage medium of claim 8, wherein the image enhancement application is further configured to:
determine whether a selected image enhancement technique sufficiently improves user experience; and
in response to the image enhancement technique not sufficiently improving user experience, discontinue application of the image enhancement technique.

13. The non-transitory storage medium of claim 8, wherein reducing appearance of artifacts in the received frame comprises the image enhancement application:
detecting an edge in the frame;
determining whether the edge belongs to a user-interface object or is caused by artifacts;
in response to the edge being caused by artifacts, blurring the edge; and
in response to the belonging to a user-interface object, preserving the edge.

14. The non-transitory storage medium of claim 13, wherein determining whether the edge belongs to the user-interface object or is caused by artifacts comprises:
determining whether a color variance along the edge is greater than a predetermined threshold; and
in response to the color variance being greater than the threshold, identifying the edge as being caused by artifacts.

15. A computer system, comprising:
a processor;
memory coupled to the processor; and
a storage device storing instructions which when loaded into the memory and executed by the processor cause the processor to perform a method, the method comprising:
executing, on a client device in communication with a remoting server, an image enhancement application, the image enhancement application configured to perform the following three image enhancement techniques:
predicting a frame based on previously received frames;
interpolating a frame based on at least two buffered frames; and
reducing appearance of artifacts in a received frame;
the image enhancement application further configured to:
monitor a sequence of frame updates for a display screen received at the client device from the remoting server;
observe the available network bandwidth, frame refresh rate, and image quality corresponding to the received sequence of frame updates; and
select one or more of the three image enhancement techniques to apply on the client device based on the observed network bandwidth, frame refresh rate, and/or image quality being sufficiently low.

16. The computer system of claim 15, wherein the image enhancement application is further configured to:
determine a type of content distributed by the remoting server; and
wherein selecting an image enhancement technique is further based on the type of content distributed by the remoting server.

17. The computer system of claim 15, wherein the image enhancement application is further configured to:
determine if the received frame updates are associated with a response to a user interaction with a user-interface object and in response select the image enhancement technique that comprises predicting a frame based on previously received frames; and
determine if the received frame updates are associated with a streamed video and in response select the image enhancement technique that comprises interpolating a frame based on at least two buffered frames.

18. The computer system of claim 15, wherein predicting the frame based on previously received frames comprises the image enhancement application detecting a user interaction with a user-interface object and using information associated with the user interaction to assist predicting the frame; and
wherein the user interaction with the user-interface object comprises at least one of:
a window-scrolling operation;
a window-resizing operation;
a text entry into a text field;
a mouse-pointer movement;
an button click; and
a drag operation that moves the object to a new screen position.

19. The computer system of claim 15, wherein the image enhancement application is further configured to:
determine whether a selected image enhancement technique sufficiently improves user experience; and in response to the image enhancement technique not sufficiently improving user experience, discontinue application of the image enhancement technique.

20. The computer system of claim 15, wherein reducing appearance of artifacts in the received frame comprises the image enhancement application:

detecting an edge in the frame;

determining whether the edge belongs to a user-interface object or is caused by artifacts;

in response to the edge being caused by artifacts, blurring the edge; and in response to the belonging to a user-interface object, preserving the edge.

* * * * *